United States Patent
Beck et al.

(10) Patent No.: US 7,719,581 B2
(45) Date of Patent: May 18, 2010

(54) SAMPLE AND HOLD CIRCUIT AND ACTIVE PIXEL SENSOR ARRAY SAMPLING SYSTEM UTILIZING SAME

(75) Inventors: Jeffrey Steven Beck, Corvallis, OR (US); Matthew Michael Borg, Albany, OR (US)

(73) Assignee: Aptina Imaging Corporation, Grand Cayman (KY)

( * ) Notice: Subject to any disclaimer, the term of this patent is extended or adjusted under 35 U.S.C. 154(b) by 0 days.

(21) Appl. No.: 12/108,002

(22) Filed: Apr. 23, 2008

(65) Prior Publication Data
US 2008/0198245 A1 Aug. 21, 2008

Related U.S. Application Data

(63) Continuation of application No. 10/798,979, filed on Mar. 11, 2004, now Pat. No. 7,388,608.

(51) Int. Cl.
*H04N 9/64* (2006.01)
*H04N 3/14* (2006.01)
(52) U.S. Cl. .................. 348/243; 348/241; 348/294
(58) Field of Classification Search ............ 348/243, 348/298, 300, 301, 307
See application file for complete search history.

(56) References Cited

U.S. PATENT DOCUMENTS

| | | | |
|---|---|---|---|
| 4,786,831 A | 11/1988 | Morse et al. | |
| 6,342,919 B2 * | 1/2002 | Opris | 348/241 |
| 6,365,950 B1 | 4/2002 | Sohn | |
| 6,423,961 B1 | 7/2002 | Niederkorn et al. | |
| 6,476,864 B1 | 11/2002 | Borg et al. | |
| 6,567,028 B2 | 5/2003 | Huang et al. | |
| 6,753,913 B1 * | 6/2004 | Bilhan et al. | 348/241 |
| 7,113,215 B2 | 9/2006 | Kokubun | |
| 7,133,074 B1 * | 11/2006 | Brehmer et al. | 348/308 |
| 7,279,668 B2 * | 10/2007 | Misek | 250/208.1 |
| 7,304,674 B2 * | 12/2007 | Mentzer et al. | 348/300 |
| 2004/0036783 A1 | 2/2004 | Barna | |

* cited by examiner

*Primary Examiner*—Luong T Nguyen
(74) *Attorney, Agent, or Firm*—RatnerPrestia

(57) ABSTRACT

An active pixel sensor array sampling system includes a plurality of video circuits and reset circuits. A video circuit generates a video voltage from each one of the pixels of a column of pixels. An associated reset circuit generates a reset voltage for each of the pixels of a column of pixels. The video circuits and the reset circuits are closed loop sample and hold circuits. The active pixel sensor array is integrated on an integrated circuit.

18 Claims, 3 Drawing Sheets

SAMPLE AND HOLD CIRCUIT AND ACTIVE PIXEL SENSOR ARRAY SAMPLING SYSTEM UTILIZING SAME

CROSS REFERENCE TO RELATED APPLICATIONS

This application is a Continuation of application Ser. No. 10/798,979 filed Mar. 11, 2004.

BACKGROUND OF THE INVENTION

Active pixel sensor arrays, such as may be employed to advantage in CMOS imaging arrays, are well known in the art. In such arrays, active pixels, usually arrayed in columns and rows, generate an output voltage having a magnitude related to the intensity of light of an image impending on the pixels. The output magnitudes are then quantized to permit digital storage and/or display of the image.

Sampling circuits are generally utilized for reading the pixel voltage of each pixel. To that end, the pixel voltage of each pixel is sampled and held by a corresponding respective column sample and hold circuit. The pixel voltage of all pixels in a row of pixels are sampled in parallel.

Following sampling of the row of pixels, a reset voltage associated with each pixel is also sampled. Hence, associated with each pixel voltage sample and hold circuit is a reset voltage sample and hold circuit. The need for such reset voltages is well known in the art. The reset voltages for all pixels in a row of pixels are also sampled and held in parallel following the pixel voltage sampling.

With each pixel and reset voltage sampled and held for each pixel in a row of pixels, the pixel voltage and reset voltages for each pixel are then read together for storage or display. The pixel and reset voltage for each pixel when read may be inputted to a differential amplifier which subtracts the pixel voltage from the reset voltage to provide a differential voltage which is then quantized for storage and display. The pixel and reset voltages of the pixels are read in series, one pixel at a time, until all of the pixel and reset voltages of a row of pixels are read. Then, the next row of pixels are addressed and the above process is repeated.

The need for accurate and reliable pixel voltage and reset voltage reading is critical to a quality image reproduction. Any sampling errors, especially those of a repetitive nature, can result in, for example, column wise noise and unwanted horizontal stripes in the final image. Such image imperfections may be readily perceptible by the human eye.

Prior sampling circuits have utilized differential source-follower-type buffers for sampling and holding pixel and reset voltages. These circuits suffer from sources of error such as source-follower transistor mismatch, current source mismatch, sampling error mismatch, and signal dependent charge injection. All of these errors can be coherent in nature and result in perceptible column-wise error. The present invention is therefore generally directed to a sample and hold circuit which may be employed to advantage in active pixel sampling array systems which avoid the coherent errors mentioned above. Active pixel sensor arrays, such as may be employed to advantage in CMOS imaging arrays, are well known in the art. In such arrays, active pixels, usually arrayed in columns and rows, generate an output voltage having a magnitude related to the intensity of light of an image impending on the pixels. The output magnitudes are then quantized to permit digital storage and/or display of the image.

Sampling circuits are generally utilized for reading the pixel voltage of each pixel. To that end, the pixel voltage of each pixel is sampled and held by a corresponding respective column sample and hold circuit. The pixel voltage of all pixels in a row of pixels are sampled in parallel.

Following sampling of the row of pixels, a reset voltage associated with each pixel is also sampled. Hence, associated with each pixel voltage sample and hold circuit is a reset voltage sample and hold circuit. The need for such reset voltages is well known in the art. The reset voltages for all pixels in a row of pixels are also sampled and held in parallel following the pixel voltage sampling.

With each pixel and reset voltage sampled and held for each pixel in a row of pixels, the pixel voltage and reset voltages for each pixel are then read together for storage or display. The pixel and reset voltage for each pixel when read may be inputted to a differential amplifier which subtracts the pixel voltage from the reset voltage to provide a differential voltage which is then quantized for storage and display. The pixel and reset voltages of the pixels are read in series, one pixel at a time, until all of the pixel and reset voltages of a row of pixels are read. Then, the next row of pixels are addressed and the above process is repeated.

The need for accurate and reliable pixel voltage and reset voltage reading is critical to a quality image reproduction. Any sampling errors, especially those of a repetitive nature, can result in, for example, column wise noise and unwanted horizontal stripes in the final image. Such image imperfections may be readily perceptible by the human eye.

Prior sampling circuits have utilized differential source-follower-type buffers for sampling and holding pixel and reset voltages. These circuits suffer from sources of error such as source-follower transistor mismatch, current source mismatch, sampling error mismatch, and signal dependent charge injection. All of these errors can be coherent in nature and result in perceptible column-wise error. The present invention is therefore generally directed to a sample and hold circuit which may be employed to advantage in active pixel sampling array systems which avoid the coherent errors mentioned above.

BRIEF DESCRIPTION OF THE DRAWINGS

The foregoing aspects and many of the attended advantages of this invention will become more readily appreciated as the same become better understood by reference to the following detailed description, when taken in conjunction with the accompanying drawings, wherein.

DETAILED DESCRIPTION OF THE INVENTION

In accordance with one aspect of the present invention, an active pixel sensor array sampling system comprises at least one video circuit that generates a video voltage from each one of a group of pixels and at least one reset circuit that generates a reset voltage associated with each one of the pixels in the group of pixels. One of the at least one video circuit and at least one reset circuit comprises a closed loop sample and hold circuit.

The closed loop sample and hold circuit may comprise, for example, a single ended common source amplifier. The amplifier may include a capacitor for holding one of the video voltages and the reset voltages. The sample and hold circuit may further include an amplifier having an input and an output and switches that place its capacitor across its input and output.

The pixels of the system are preferably arranged in columns and rows. The at least one video circuit preferably comprises a plurality of video amplifiers, each video amplifier being associated with a respective column of pixels. The at least one reset circuit preferably comprises a plurality of reset amplifiers, each reset amplifier being associated with one of the video amplifiers.

In accordance with a further embodiment of the invention, an active pixel sensor array sampling system comprises a video circuit that generates a video voltage for each one of a group of pixels and a reset circuit associated with a video circuit that generates a reset voltage associated with each of the pixels in the group of pixels. The video circuit and the reset circuit each comprise a closed loop sample and hold circuit.

In a further embodiment, the present invention provides a video amplifier. The video amplifier may be utilized to advantage for sampling an active pixel sensor array. The video amplifier preferably comprises a closed loop sample and hold circuit.

According to a further embodiment of the invention, an integrated circuit includes a video amplifier for use in sampling an active pixel sensor array. The video amplifier of the integrated circuit comprises a closed loop sample and hold circuit.

The following discussion is presented to enable a person skilled in the art to make and use the invention. The general principals described herein may be applied to embodiments and applications other than those detailed below without departing from the spirit and scope of the present invention. The present invention is not intended to be limited to the embodiments shown, but is to be accorded the widest scope consistent with the principals and features disclosed or suggested herein.

Figure 1:
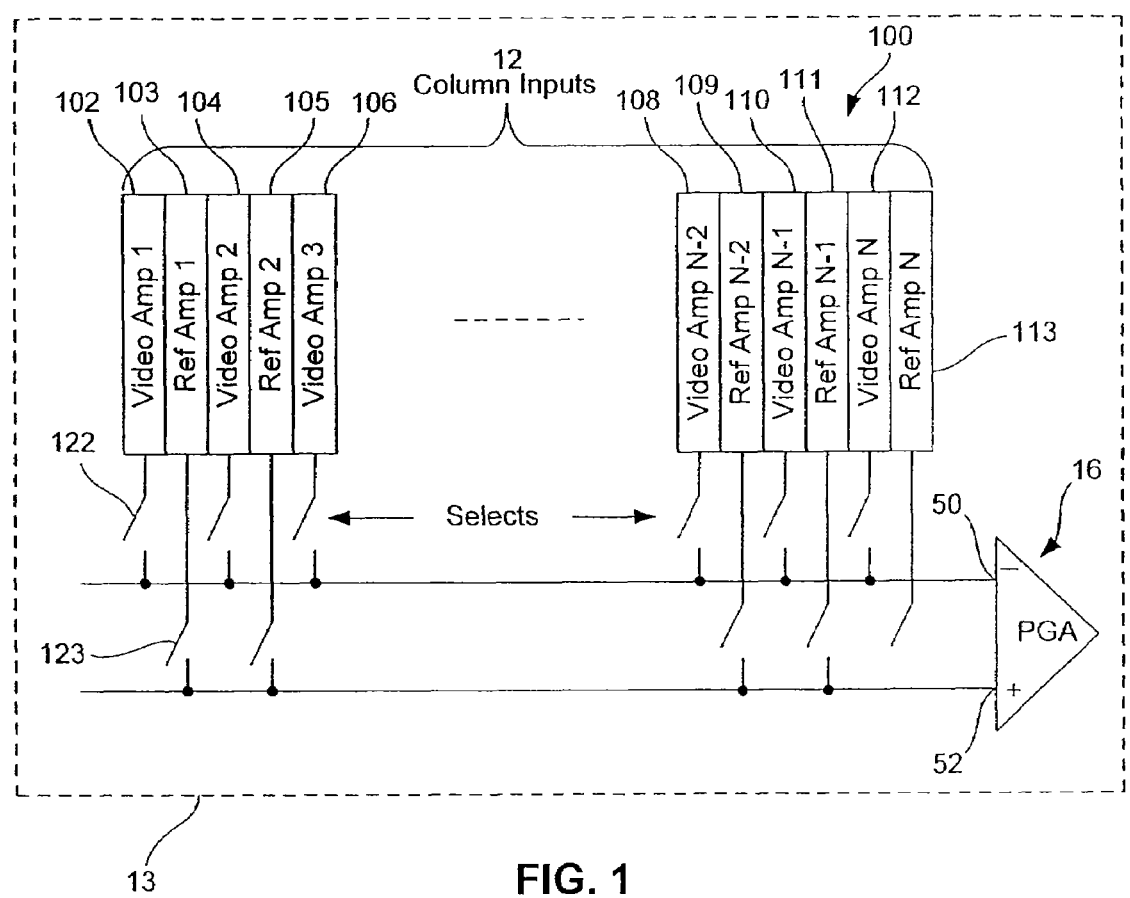
FIG. 1 is a block diagram of an active pixel sensor array sampling system embodying the present invention.

Referring now to FIG. 1, it illustrates an active pixel sensor array sampling system 100 embodying the present invention. The system 100 is formed in an integrated circuit 13, such as a CMOS integrated circuit. The system 100 includes a differential amplifier 16 which provides a differential voltage for each pixel representing the difference between the pixel voltage and the pixels associated reset voltage. The video circuit further includes a plurality of video amplifiers 102, 104, 106, 108, 110, and 112. Each of the video amplifiers is associated with one of the columns of pixels. The reset circuit includes a plurality of reset amplifiers 103, 105, 107, 109, 111, and 113. Each of the reset amplifiers is associated with one of the column video amplifiers. Hence, each column of pixels has associated with it a video amplifier and a reset amplifier.

The video and reference amplifiers of FIG. 1 are coupled to the differential amplifier 16 through a switch associated with each amplifier. To that end, video amplifier 102 is selectively coupled to input 50 of the differential amplifier 16 by a switch 122. Similarly, reset amplifier 103 is coupled to the input 52 of the differential amplifier 16 by its associated switch 123. Similarly, each pair of video and reset amplifiers includes a pair of switches. The switches of each pair of video and reset amplifier switches open and close together. The switch pairs close when a pixel and reset voltage of its associated pixel is read and transferred to the differential amplifier 16.

Figure 2:
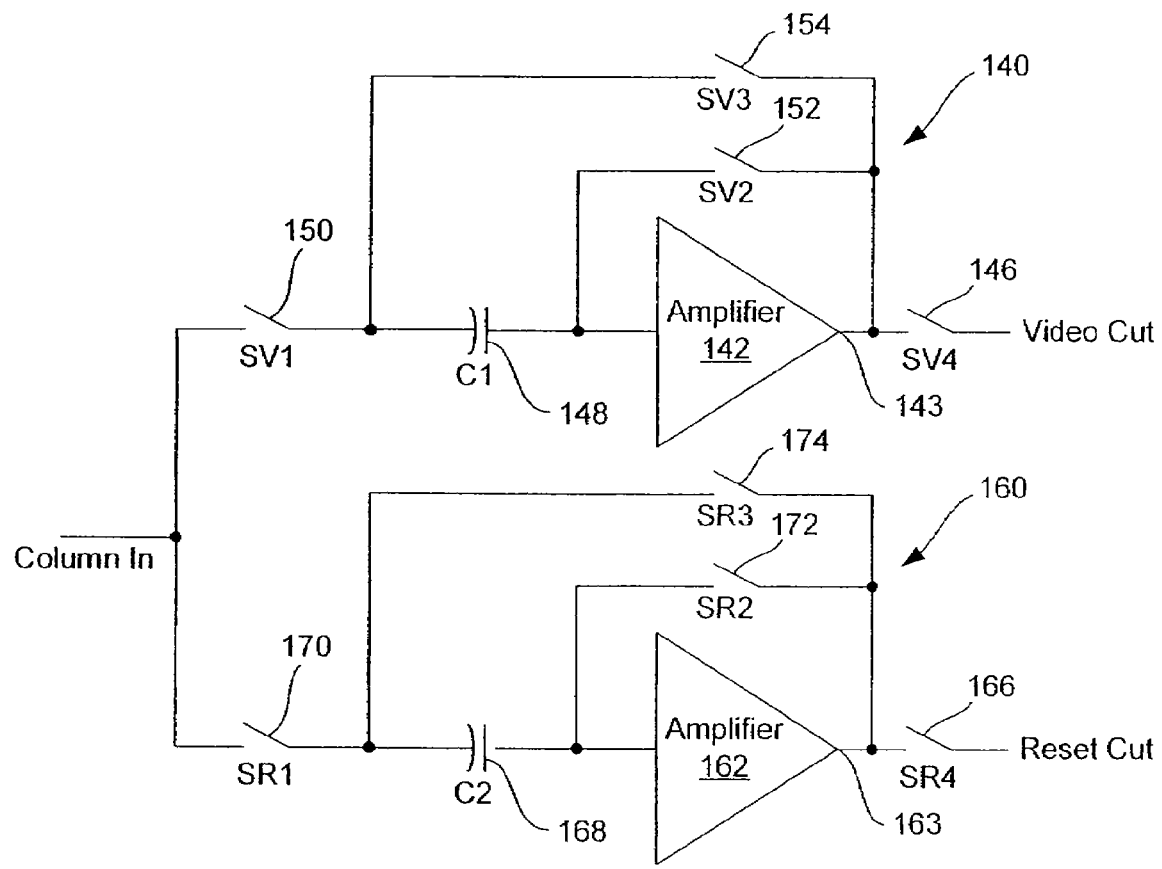
FIG. 2 is a schematic circuit diagram of a video and reset amplifier pair which may be used to advantage in the system of FIG. 1 and which embodies the present invention.

FIG. 2 shows a circuit diagram of a video amplifier and reset amplifier pair which may be utilized in an active pixel array sampling system embodying the present invention. The video amplifier 140 of the amplifier pair includes an amplifier 142, switch 146, capacitor 148, and switches 150, 152, and 154.

The reference amplifier 160 includes an amplifier 162, a switch 166, a capacitor 168, and switches 170, 172, and 174. The video amplifier circuit 140 and reference amplifier 160 operate in the same manner. As will be seen hereinafter, each of the amplifiers 142 and 162 is a single ended common source amplifier. The switches 146 and 166 couple the video and reset amplifiers to the differential amplifier when a pixel and reset voltage of a pixel associated with the circuits 140 and 160 are read.

Figure 3:
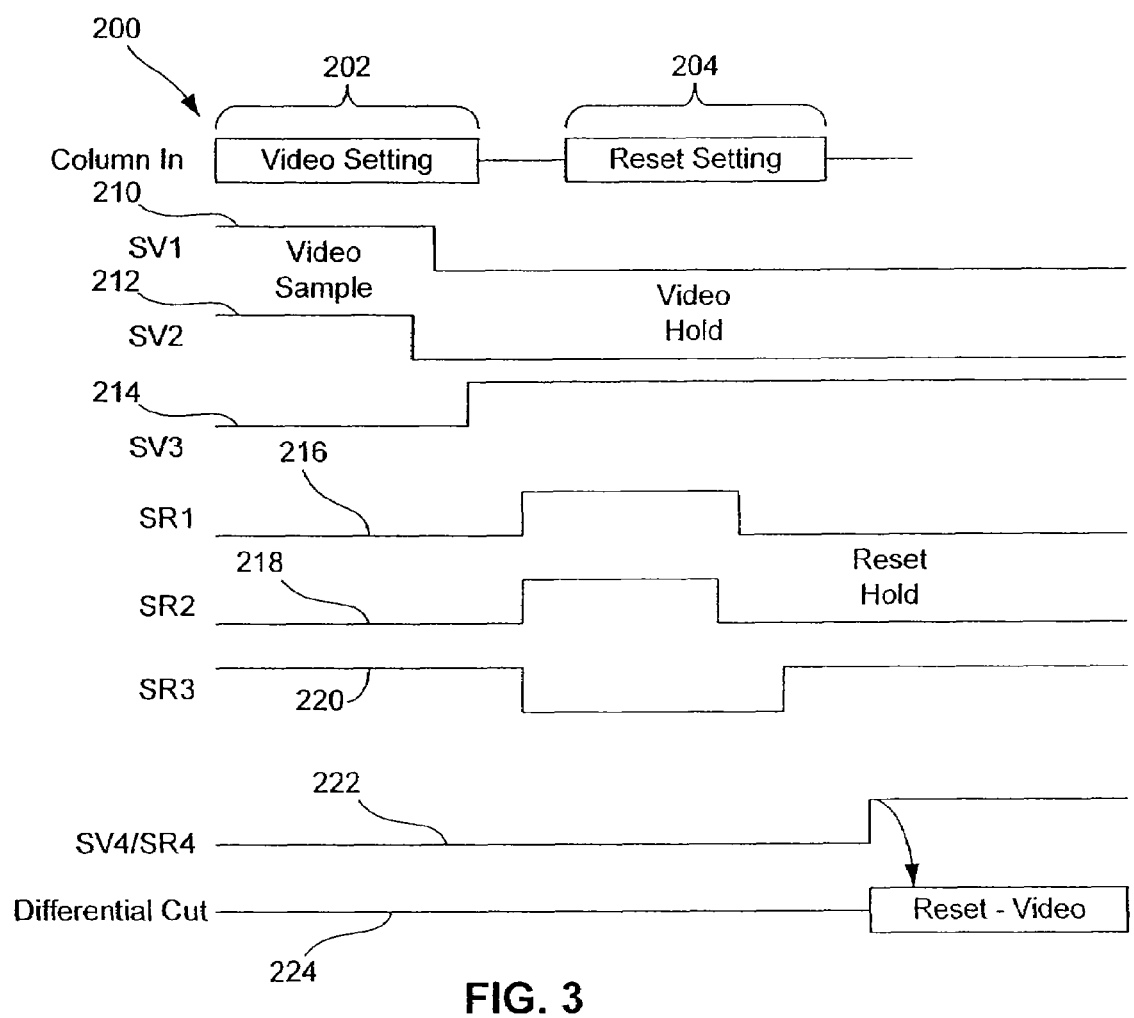
FIG. 3 illustrates a series of waveforms of control signals which may be utilized to advantage in the system of FIG. 1.

Since the operation of circuits 140 and 160 is identical, only the operation of the circuit 140 will be described in detail herein. Reference may be had to FIG. 3 during this description which shows various control signals for controlling the switches 150, 152, and 154.

When a video voltage is to be sampled and held, switch 150 starts out closed to input the pixel voltage. Switch 152 is also closed and switch 154 is opened. This may be seen from the control signals of FIG. 3 wherein control signal 210 which controls switch 150 is high, control signal 212 which controls switch 152 is high, and control signal 214 which controls switch 154 is low. When the control signals are high, their corresponding switches are closed, and when the control signals are low, the corresponding switches are open. Also at this time, switch 146 is open under control of control signal 222.

With switch 152 closed, the amplifier 142 is caused to be in unity gain feedback. Hence, there is no gain around the amplifier 142. The output is fed back to the input of amplifier 142 by switch 152 and remains at a constant common mode level.

When a pixel voltage is brought into the circuit 140, it appears at one of the plates of capacitor 148. Now, a charge is on capacitor 148 which is equal to the voltage difference across the capacitor. This voltage difference is the inputted pixel voltage on one side of the capacitor and the common mode level of the amplifier 142 on the other. That voltage, multiplied by the capacitance value of capacitor 148, is the charge across the capacitor. Hence, at this time, the video voltage has been sampled.

Next, as will be noted from control signal 212 going low, switch 152 opens to cause the input pixel voltage to be held. The charge on capacitor 148 cannot now be changed because there is no DC path for charge to leak on the amplifier side of capacitor 148.

Next, as may be seen from control signal 210 going low, switch 150 opens to disconnect the input node of capacitor 148 from the amplifier circuit. Now, both sides of capacitor 148 are floating so that again, no charge can be lost from the capacitor 148. At this point and time, the sampling and holding of the video voltage is complete. Now, as will be noted from control signal 214 going high, switch 154 closes completing the connection from the input side of capacitor 148 to the output 143 of amplifier 142. This causes the output 143 of the amplifier 142 to be identical to the voltage that was at the input node of capacitor 148 during the sampling period. Hence, the pixel voltage is now available at output 143 when the pixel voltage is to be read.

The foregoing procedure is repeated by circuit 160. This causes the reset voltage to be sampled and held.

When the pixel voltage and reset voltage of each pixel in a row of pixels have been sampled and held, they are now ready to be read in series, one at a time. During a reading of the video voltage of circuit 140 and reset voltage of circuit 160, as will be noted by the control signal 222 going high, switches 146 and 166 are closed to place the video voltage at input 50 of the differential amplifier 16 and the reset voltage at input 52 of the differential amplifier 16.

While particular objects and advantages of the present invention have been shown and described in the illustrated embodiments, modifications may be made. It is therefore intended in the appended claims to cover all such changes and modifications which fall within the true spirit and scope of the invention.

What is claimed:

1. A sample and hold circuit, comprising:
an amplifier having an input terminal and an output terminal;
a column input line;
an capacitor having first and second terminals for storing charge from the column input line during a sampling period; and
first and second switches, each switch having first and second ends, the first end of the first switch being connected to the output terminal of the amplifier and the second end of the first switch being connected to the first terminal of the capacitor and the first end of the second switch being connected to the column input line and the second end of the second switch being connected to the first terminal of the capacitor for selectively switching the first terminal of the capacitor between the column input line and the output terminal of the amplifier,
wherein at a start of the sampling period the first switch is initially configured to be open and the second switch is initially configured to be closed and, during the sampling period, the first switch is switched to be closed subsequent to the second switch being switched to be opened.

2. A sample and hold circuit, comprising:
an amplifier having an input terminal and an output terminal;
a column input line;
an capacitor having first and second terminals for storing charge from the column input line during a sampling period;
first and second switches, each switch having first and second ends, the first end of the first switch being connected to the output terminal of the amplifier and the second end of the first switch being connected to the first terminal of the capacitor and the first end of the second switch being connected to the column input line and the second end of the second switch being connected to the first terminal of the capacitor for selectively switching the first terminal of the capacitor between the column input line and the output terminal of the amplifier;
a reset circuit having:
a further amplifier with an input terminal and an output terminal; and
a further capacitor for storing charge from the column input during a reset period, the further capacitor being coupled between the column input line and the input terminal of the further amplifier during the sampling period and being coupled between the input and output terminals of the further amplifier during the readout period.

3. The sample and hold circuit of claim 2, wherein the amplifier is a video amplifier and the further amplifier is a reset amplifier, the video and reset amplifiers are associated with a column of pixels of a pixel array.

4. The sample and hold circuit of claim 1, wherein the amplifier is a single ended common source amplifier.

5. The sample and hold circuit of claim 1, further comprising a third switch to connect the input and output terminals of the amplifier during the sampling period to configure the amplifier as a unity gain amplifier.

6. The sample and hold circuit of claim 2, further comprising a set of further switches having first and second ends, the first ends of the set of further switches being connected to the output terminal of the further amplifier and the second ends of the further switches being connected to first and second terminals of the further capacitor, respectively for selectively connecting the first terminal of the further capacitor to the output terminal of the further amplifier.

7. The sample and hold circuit of claim 1, wherein the second terminal of the capacitor is connected to the input terminal of the amplifier, the sample and hold circuit further comprising a third switch connected between the output terminal of the amplifier and the second terminal of the capacitor such that at a start of the sampling period the third switch is initially configured to be closed and, during the sampling period, the third switch is switched to be opened prior to the second switch being switched to be opened.

8. The sample and hold circuit of claim 7, wherein during the reset period the first switch is closed and the second and third switches are opened.

9. The sample and hold circuit of claim 2, wherein the output terminal of the amplifier and the output terminal of the further amplifier are configured to be coupled to respectively different input terminals of a differential amplifier when pixel voltage and reset voltage of a pixel are read.

10. An imager, comprising:
a pixel array having a plurality of pixels;
an amplifier having an input terminal and an output terminal;
a column input line coupled to the pixel array for supplying charge from selected ones of the plurality of pixels; and
a capacitor for storing charge from the column input line during a sampling period, and having first and second terminals, the first terminal being coupled to the column input line and uncoupled from the output terminal of the amplifier during the sampling period, the second terminal being coupled to the output terminal of the amplifier during the sample period to configure the amplifier as a unity gain amplifier, and the second terminal of the capacitor being connected to the input terminal of the amplifier,
wherein during a readout period the second terminal of the capacitor is uncoupled from the output terminal of the amplifier prior to the first terminal of the capacitor being coupled to the output terminal of the amplifier.

11. The imager of claim 10, further comprising a plurality of switches for switching the first terminal of the capacitor between the column input line and the output terminal of the amplifier.

12. The imager of claim 10, further comprising:
a reset circuit having:
a further amplifier with an output terminal; and
a further capacitor for storing charge from the column input line during a reset period, the further capacitor having a terminal: (1) coupled to the column input line and uncoupled from the output terminal of the further amplifier during the reset period; and (2) coupled to the output terminal of the further amplifier and uncoupled from the column input line during the readout period.

13. The imager of claim 10, wherein the second terminal of the capacitor is uncoupled from the output terminal of the amplifier during the reset period.

14. A video processing circuit, comprising:
an amplifier having an output terminal;
a column input line; and
a capacitor having first and second terminals and storing charge from the column input line during a first period;
a switching unit for selectively (1) connecting the first terminal of the capacitor to the column input line during the first period and connecting the second terminal of the capacitor to the output terminal of the amplifier during the first period and (2) connecting the first terminal of the capacitor to the output terminal of the amplifier and disconnecting the second terminal of the capacitor from the output terminal of the amplifier during a second period.

15. The video processing circuit of claim 14, further comprising:
a further amplifier with an output terminal; and
a further capacitor for storing charge from the column input line, the further capacitor being coupled to the column input line during a third period and being uncoupled from the column input line during the second period.

16. The video processing circuit of claim 14, wherein the second terminal of the capacitor is coupled to an input terminal of the amplifier.

17. The video processing circuit of claim 16, wherein the switching unit is configured to disconnect the first terminal of the capacitor from the column input line prior to the end of the first period and subsequently to connect the first terminal of the capacitor to the output terminal of the amplifier after a waiting period.

18. The video processing circuit of claim 16, wherein the switching unit is configured to disconnect the second terminal from the output terminal of the amplifier prior to connecting the first terminal of the capacitor to the output terminal of the amplifier.

* * * * *